United States Patent
Ebrahimzadehveshareh et al.

(10) Patent No.: US 12,031,523 B2
(45) Date of Patent: Jul. 9, 2024

(54) WIND TURBINE WITH VIRTUAL SYNCHRONOUS GENERATOR WITH DAMPING CONTROL

(71) Applicant: VESTAS WIND SYSTEMS A/S, Aarhus N. (DK)

(72) Inventors: Esmaeil Ebrahimzadehveshareh, Aalborg (DK); Torsten Lund, Fredericia (DK); Mark Faber, Risskov (DK); Poul Brandt Christensen, Ry (DK); Gert Karmisholt Andersen, Hovedgård (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/787,911

(22) PCT Filed: Dec. 18, 2020

(86) PCT No.: PCT/DK2020/050396
§ 371 (c)(1),
(2) Date: Jun. 21, 2022

(87) PCT Pub. No.: WO2021/129914
PCT Pub. Date: Jul. 1, 2021

(65) Prior Publication Data
US 2023/0050448 A1    Feb. 16, 2023

(30) Foreign Application Priority Data
Dec. 23, 2019    (DK) .......................... PA 2019 01552

(51) Int. Cl.
*F03D 7/00*    (2006.01)
*F03D 7/02*    (2006.01)
*H02P 23/04*    (2006.01)

(52) U.S. Cl.
CPC ............ *F03D 7/0272* (2013.01); *H02P 23/04* (2013.01); *F05B 2270/327* (2013.01)

(58) Field of Classification Search
CPC .. F03D 7/0272; H02P 23/04; F05B 2270/327; Y02E 10/72; Y02E 10/76
See application file for complete search history.

(56) References Cited

U.S. PATENT DOCUMENTS

2022/0085740 A1* 3/2022 Nielsen .................. F03D 13/20
2022/0321041 A1* 10/2022 Ebrahimzadehveshareh ............... H02J 3/381

FOREIGN PATENT DOCUMENTS

CN    105896570 A    8/2016
CN    106684923 A    5/2017
(Continued)

OTHER PUBLICATIONS

PCT, International Search Report for Application PCT/DK2020/050396 dated Mar. 17, 2021.
(Continued)

*Primary Examiner* — Julio C. Gonzalez
(74) *Attorney, Agent, or Firm* — Patterson + Sheridan, LLP

(57) ABSTRACT

The invention relates to a method for damping drive train oscillations of a VSM configured wind turbine. The method comprises determining a drive train damping power signal based on speed signal representing a generator speed, determining a power deviation based on a combination of a power reference for a desired power production, the drive train damping power-signal, a grid power supplied by the line side converter to the grid and a damping power, determining a virtual synchronous machine angle based on the power deviation so that the derivative of the virtual synchronous machine rotational speed is indicative of the power deviation, determining a converter reference for controlling the
(Continued)

line side converter to generate the desired active power based on the virtual synchronous machine angle and a voltage reference for a voltage amplitude to be generated by the line side converter, and applying the converter reference to the line side converter.

14 Claims, 5 Drawing Sheets

(56) References Cited

FOREIGN PATENT DOCUMENTS

| | | |
|---|---|---|
| CN | 107634524 A | 1/2018 |
| CN | 108736517 A | 11/2018 |
| CN | 110601272 A | 12/2019 |
| EP | 2487784 A1 | 8/2012 |
| EP | 2865889 A1 | 4/2015 |
| WO | 2008145128 A2 | 12/2008 |
| WO | 2021129914 A1 | 7/2021 |

OTHER PUBLICATIONS

PCT, Written Opinion of the International Searching Authority for Application PCT/DK2020/050396 dated Mar. 17, 2021.

Danish Patent and Trademark Office, 1st Technical Examination including the Search Report and Search Opinion for Application PA 2019 01552 dated Jun. 15, 2020.

\* cited by examiner

WIND TURBINE WITH VIRTUAL SYNCHRONOUS GENERATOR WITH DAMPING CONTROL

FIELD OF THE INVENTION

The invention relates to control of wind turbines, and particularly control of wind turbines configured to exhibit a virtual synchronous generator response.

BACKGROUND OF THE INVENTION

In order to allow a much higher penetration of renewable energy sources such as wind turbines into the electrical grid, some countries propose requirements to equip the power converters with grid-forming properties similar to conventional synchronous generators. These requirements can be addressed by configuring the renewable power generating units as virtual synchronous machines.

Conventional wind turbines may be configured to damp mechanical oscillations in the drive train or other parts of the wind turbine by modulating the generated active power. This may be achieved by modifying the power reference according to a signal representing the oscillation and controlling the generated active power based on the modified power reference by controlling the machine side converter based on the modified power reference.

The method is seen not to be suitable for wind turbines configured virtual synchronous machines, in short VSMs. Accordingly, it is a problem that VSM configured wind turbines may not be able to utilize existing drive train damping methods of wind turbines. Therefore, there is need for a drive train damping method, or generally a method for damping mechanical oscillations, which is suited for controlling VSM configured wind turbines.

SUMMARY OF THE INVENTION

It is an object of the invention to improve control of power generating units such as wind turbines to alleviate one or more of the above mentioned problems, and therefore to provide a method which provides improved control methods of virtual synchronous machines, particularly power generation based methods for damping mechanical oscillations.

In a first aspect of the invention, a method for damping mechanical oscillations such as drive train oscillations of a wind turbine is provided, the wind turbine comprises a drive train driven by a rotor, a generator driven by the drive train, a machine side converter, and a line side converter arranged to supply power to a grid,
the method comprises
- obtaining a speed signal representing a rotation speed of the generator,
- determining a drive train damping power-signal based on the speed signal,
- determining a power deviation based on a difference between a power reference for a desired power output of the wind turbine, a damping power and a grid power supplied by the line side converter to the grid,
- determining a virtual synchronous machine rotational speed and/or a virtual synchronous machine angle based on the power deviation so that the derivative of the virtual synchronous machine rotational speed is indicative of the power deviation,
- providing a voltage reference for a voltage amplitude or a reactive power to be generated by the line side converter,
- determining a converter reference for controlling the line side converter to generate the desired active power based on the virtual synchronous machine angle and the voltage reference, and
- applying the converter reference to the line side converter.

Advantageously, by determining virtual synchronous machine angle based on the train damping power signal which reflects the mechanical oscillations via the speed signal, the line side converter is advantageously used to generate variations in the active power based on the virtual synchronous machine angle.

According to an embodiment, the drive train damping power signal is determined so that it comprises a signal component which depends on the mechanical oscillations. According to a further embodiment, determining the drive train damping power-signal comprises applying a filter to the speed signal, such as a band pass filter. Advantageously, the filter is designed to pass frequencies within a frequency range which comprises the oscillation frequencies. Accordingly, the filter may be designed according to known eigen-frequencies of the wind turbine, such as eigenfrequencies of the drive train or the rotor blades.

According to an embodiment, determining the drive train damping power signal comprises applying a bandwidth modifying filter to increase the bandwidth and adjust the phase of a transfer function defining the relationship between the drive train damping power-signal and the grid power.

Advantageously, by increasing the bandwidth, it may be avoided that the frequency components of the speed signal which correspond to the frequency of the oscillations are damped or phase-shifted due the otherwise limited bandwidth of the transfer function.

According to an embodiment, the bandwidth modifying filter is determined dependent on a short circuit ratio of the grid, where the bandwidth of the transfer function depends on the short circuit ratio.

According to an embodiment, the method comprises comprising modifying, such as reducing, the amplitude of the drive train damping power-signal dependent on the power reference.

Particularly, the amplitude of the drive train damping power-signal may be reduced for low power generation situations where the power reference is low.

Otherwise, a high amplitude of the drive train damping power-signal amplitude would be added to the low power reference which would lead to significant variation in the power output.

In a further embodiment, the modification of the amplitude is determined so that the amplitude of the train damping power-signal is reduced if the power reference is below a given power threshold.

According to an embodiment, the method further comprises modifying, such as increasing, the damping power dependent on the power reference.

Advantageously, the damping power may be increased, e.g. for low values of the power reference, to improve stability of the closed loop control of the active power.

In a further embodiment, the modification of the damping power is determined so that the damping power is increased if the power reference is below a given power threshold. The increase of the damping power may be performed with a fixed increased factor, for low power references, which is multiplied with a determined damping power. For values of the power reference above this power threshold, or above another higher power threshold located higher the said given power threshold, the damping power may be unaffected.

In a further embodiment, the rate of change of the damping power may be limited by use of a rate limiter to avoid sudden steps in the damping power and, thereby, improve stability of the closed loop control of the active power generation. According to an embodiment, the virtual synchronous machine rotational speed is determined based on a combination of a feedback of the damping power, the power reference, the drive train damping power-signal, the grid power and an inertial integration model, where the virtual synchronous machine angle is determined based on an integration of the virtual synchronous machine rotational speed, and where the damping power is determined based on the virtual synchronous machine rotational speed.

According to an embodiment, the method comprises
obtaining a network voltage at a connection point of the output of the line side converter
determining a rotational speed of the grid based on the network voltage, and
determining the damping power based on the virtual synchronous machine rotational speed and the rotational speed of the grid.

A second aspect of the invention relates to a control system configured for damping mechanical oscillations such as drive train oscillations of a wind turbine, the wind turbine comprises a drive train driven by a rotor, a generator driven by the drive train, a machine side converter, and a line side converter arranged to supply power to a grid, wherein the control system is configured to perform the method according to first aspect.

A third aspect of the invention relates to a wind turbine comprising a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
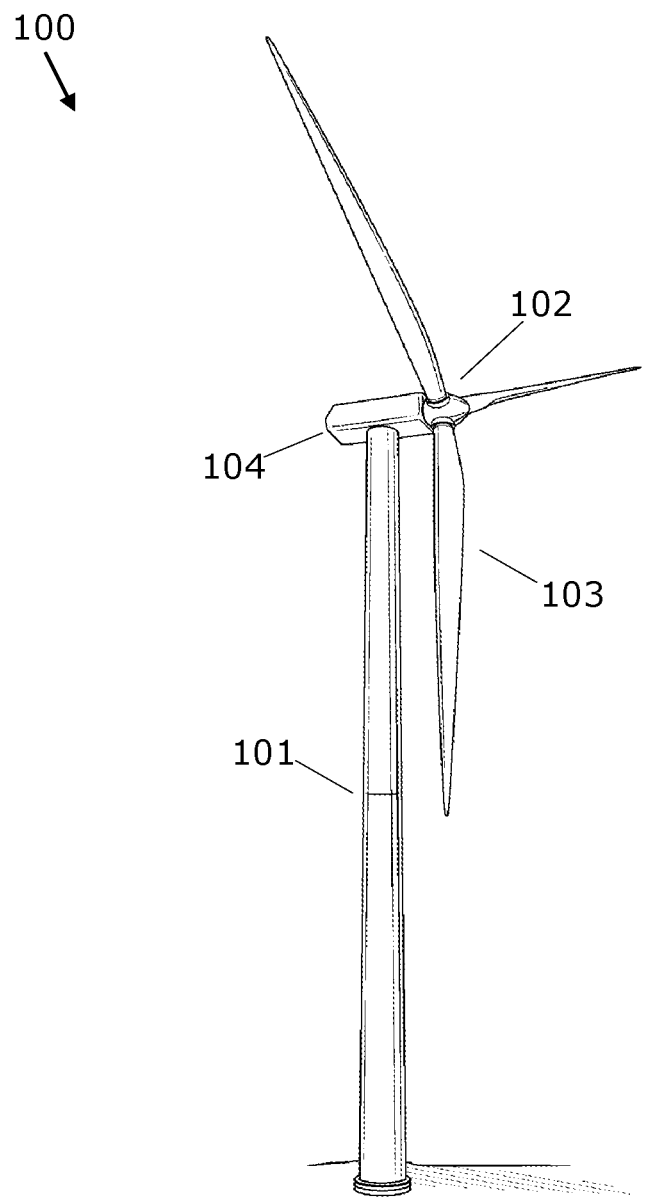
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The drive train comprises the shaft connecting the rotor 102 with the gearbox or the generator. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side converter. The generator side converter converts the generator AC power into DC power and the line side converter converts the DC power into an AC power for injection into the utility grid.

Figure 2A:
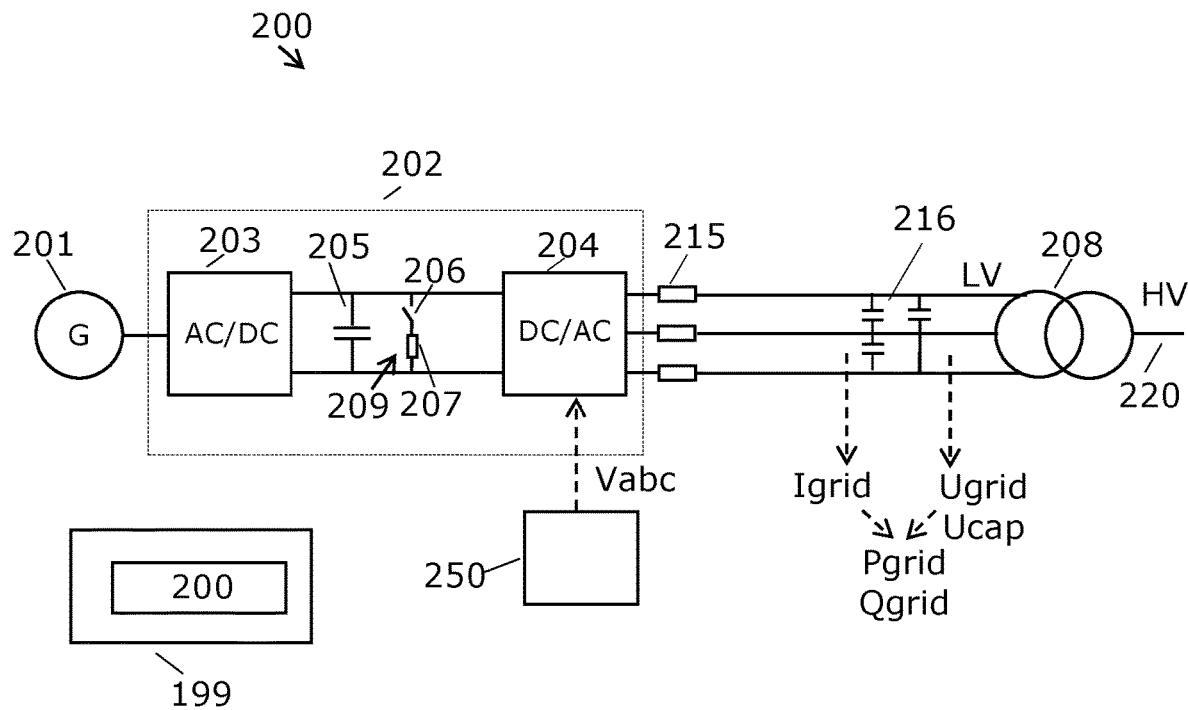
FIG. 2A shows an example of a power system of a wind turbine or a power generating unit.

FIG. 2A shows an example of a power system 200 of a wind turbine 100 according to an embodiment. The power system comprises a generator or power source 201 and a power converter 202.

The power converter 202 comprises a machine side converter 203 and a line side converter 204. The power converter 202 may further comprise a DC-link 205 and a resistor 207 connected with a controllable switch 206. The resistor and switch forms a power dissipation device, also known as a chopper 209, for dissipating active power. The DC-link 205 comprises one or more DC-link capacitors which are charged by the DC output current from the generator side converter 203 and which supplies DC power to the line side converter 204. Alternatively, the power converter 202 may be configured as a multi-level converter where the DC capacitance is distributed in the arms of the converters. In this case, the DC-link capacitors in FIG. 2A and possibly also the switch 206 may be absent. However, in general the power converter 202 comprises a machine side converter 203 and a line side converter 204.

The power converter 202 may be full-scale converter configured according to different principles including forced-commutated and line-commutated converters. The output AC current from the line side converter 204 may be supplied via output inductors 215 and possibly via a wind turbine transformer 208 to the power line 220. In this example, the output AC current is a 3-phase current output. Harmonic filter capacitors 216 may be arranged between the conductors of the output, which together with the inductors 206, forms a harmonic filter which converts the square wave voltage signals from the line side converter 204 to voltage sinusoidal signals.

The power line 220 may be a medium voltage power bus which receives power from other wind turbines 100. The power line 220 may be connected with a high voltage network, e.g. via further transformers. Thus, the power line 220 and one or more power systems 200 of corresponding wind turbines constitutes a wind power plant or park arranged to supply power to a utility grid for distribution of electrical power.

The power system 200 is principally illustrated and therefore does not explicitly reveal that the system may be a three phase system. However, principles of the described embodiments apply both to single and multi-phase systems.

The line side converter 204 uses some variant of pulse width modulation (PWM) for converting the DC power into AC power. The control system 250 is used for controlling the modulation of the line side converter 204 and for controlling the active power P and the reactive power Q generated by the line side converter 204.

FIG. 2A shows that the grid voltage Ugrid, here the voltage at the low voltage LV side of the transformer 208, can be measured. The grid voltage Ugrid can be used for determining a virtual synchronous machine angle θVSM (as described elsewhere) and for controlling the power output of the converter, based on determining the active power Pgrid from grid voltage Ugrid and grid current Igrid. The reactive power Qgrid may similarly be determined from Ugrid and Igrid. Alternatively, the grid voltage Ugrid may be measured on the high voltage HV side of the transformer and corrected based on the turns ratio of the transformer, or the internal voltage magnitude reference Vqref is used instead of the measured voltage Ugrid. Thus, in an alternative, internal voltage magnitude reference such as Vqref, Vdqref or Vαβref may be used for determining Pgrid and consequently the synchronous machine angle θVSM. The grid current Igrid supplied to the grid can also be measured.

Figure 2B:
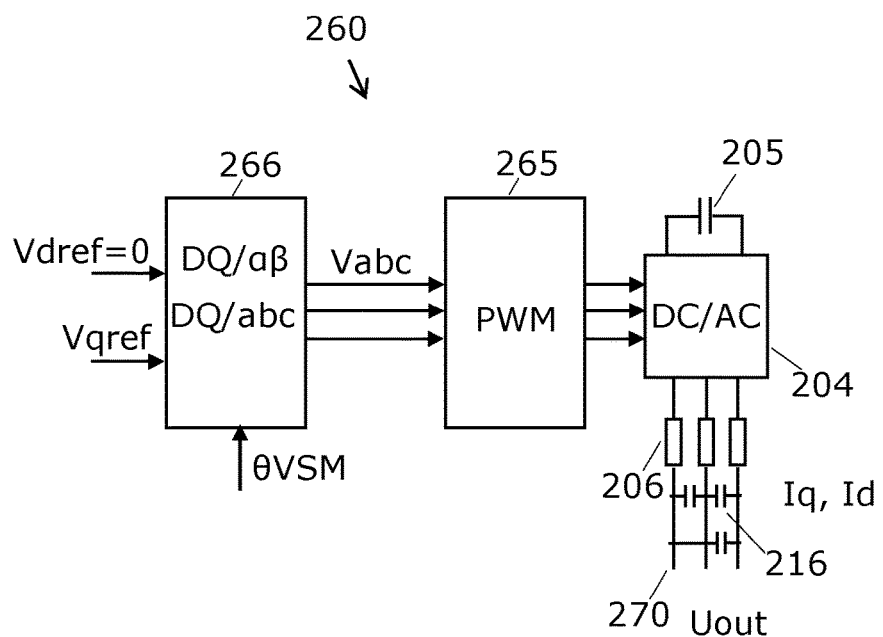
FIG. 2B shows control components arranged for controlling the generation of active power and reactive power supplied to the grid at the power output of the wind turbine or power generating unit.

FIG. 2B shows an example of control components 260 arranged for controlling the generation of active power Pgrid and reactive power Qgrid supplied to the grid at the power output 270 from the wind turbine 100 or power generating unit 199. That is, the control components 260 may be arranged for controlling the output active power Pgrid and the output voltage magnitude at the low voltage side LV, alternatively for controlling the output active power Pgrid and the output reactive power Qgrid at the low voltage side LV. One or more of the control components 260, such as the frame conversion unit 266, may be comprised by the control system 250. For example, the frame conversion unit 266 may be comprised by the control system 250 which provides the determined converter reference Vabc for the line side converter 204 or for the PWM modulator 265 which may be comprised by the line side converter 204. In this way the line side converter 204 is controlled based on the converter reference Vabc.

References for the active and reactive power may be received from a power plant controller, PPC, or a grid operator, TSO, or determined from active and reactive power references, e.g. from the grid operator.

The active power, Pgrid, is controlled via the virtual synchronous machine angle θVSM. In short, the synchronous machine angle acceleration (the double-time derivative of θVSM) indicates a difference between a power reference Pref for a desired power output of the wind turbine and a grid power Pgrid supplied by the wind turbine to a power grid. Examples for determining the synchronous machine angle θVSM is given elsewhere.

The synchronous machine angle θVSM may be used to transform the signals from the rotating DQ frame into a non-rotating frame such as the αβ or abc frame, or vice-versa. Based on the synchronous machine angle θVSM and voltage magnitude reference Vqref, control signals for the desired active power and reactive power are determined.

Thus, the synchronous machine angle θVSM may be defined in a rotating DQ frame defined by the angular position θVSM. Based on the synchronous machine angle θVSM, control signals, i.e. the angle of the modulation voltage signals for the pulse-width-modulator PWM, 265 are determined and transformed into a non-rotating frame such as the αβ or abc frame. The resulting converter reference signal Vabc controls the active and reactive power Pgrid and Qgrid.

The frame conversion unit 266 transforms the control signal from the DQ frame into the αβ or abc frame and determines the sinusoidal converter reference signal Vabc for the PWM 265. The frame converted output signals from the frame conversion unit 266 are converted by the pulse-width-modulator PWM, 265 into a modulation signal for the grid side converter 204 in order to generate the desired active power Pgrid and reactive power Qgrid and/or voltage magnitude Ugrid.

The reactive power Qgrid to be generated by the line side converter 204 can be controlled based on a voltage magnitude reference Vqref.

In general, the voltage reference Vqref may be a reference for a voltage amplitude Ugrid or a reactive power Qgrid to be generated by the line side converter 204. In this way, based on the voltage reference Vqref and the synchronous machine angle θVSM, the converter reference Vabc is determined for controlling the line side converter 204 to generate the desired active power Pgrid and consequently the reactive power Qgrid.

The voltage magnitude reference Vqref may be defined in the DQ frame which rotates with the rotational speed ωVSM of the virtual synchronous machine, i.e. in steady state condition the fundamental frequency such as 50 Hz of the AC grid voltage. The voltage magnitude reference Vqref may be converted from the DQ frame to the αβ or abc frame and outputted from the frame conversion unit 266 as a converter reference Vabc to the pulse-width-modulator PWM, 265 which determines the modulation signal for the grid side converter 204.

Figure 3:
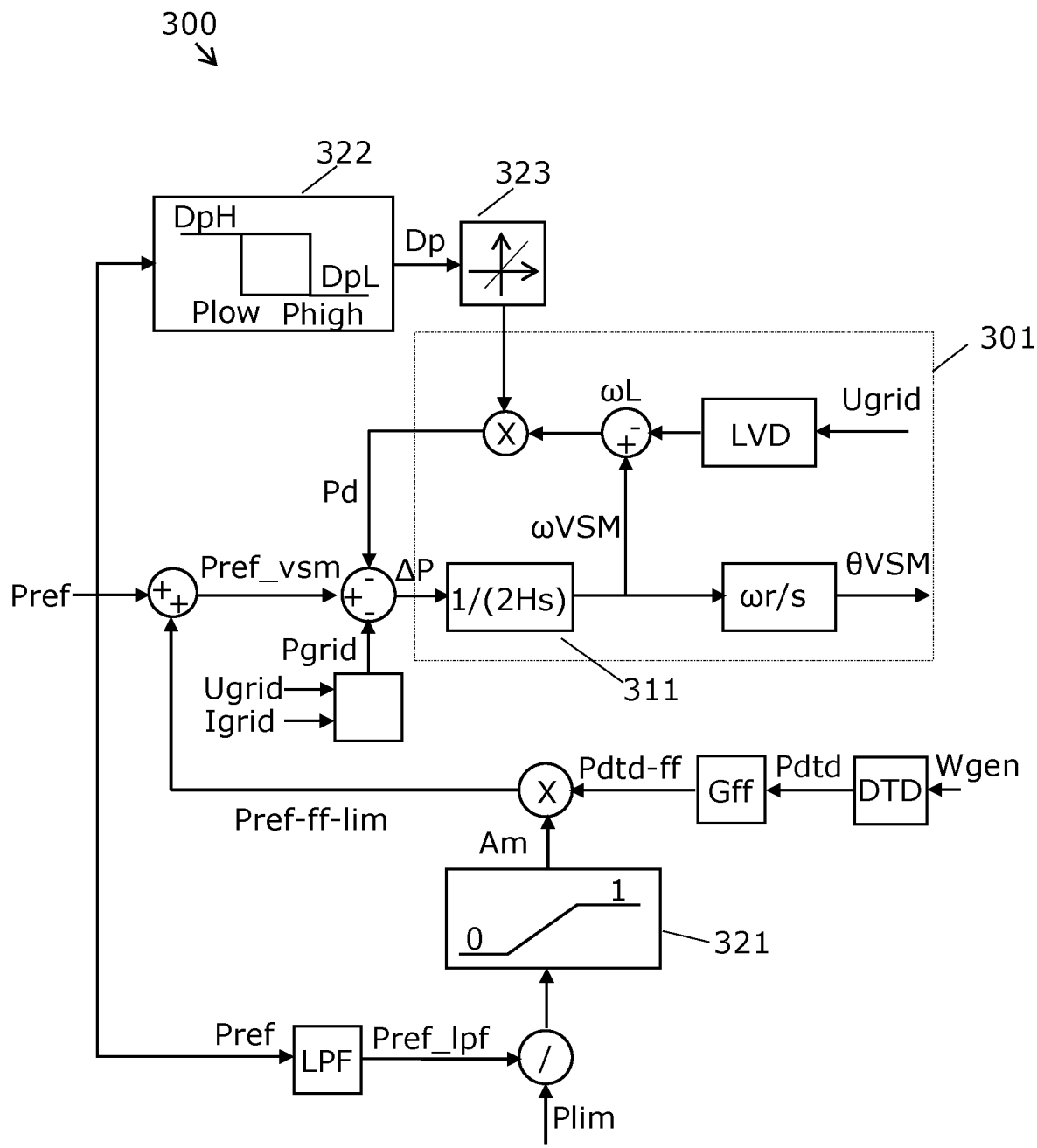
FIG. 3 shows an embodiment of a damping method for a wind turbine configured as virtual synchronous generator.

FIG. 3 shows an example of a damping control system 300 for implementing the virtual synchronous generator with the train damping method for damping mechanical oscillations. The damping control system 300 may be comprised by the control system 250, e.g. so that the damping control system provides the synchronous machine angle θVSM to the frame conversion unit 266.

The idea of the damping method is to damp mechanical oscillations in the drive train, the rotor blades 103, the tower 101 or other components using modulated active power. The damping is based on a speed signal Wgen representing a rotation speed of the generator. When the mechanical oscillations, such as blade or tower oscillations, affect the generator speed Wgen, the corresponding variations in the generator speed represents the mechanical oscillations. By determining and generating variations in the production of active power based the generator speed variations, it is possible to achieve a damping of the mechanical oscillations.

Traditionally, such damping of mechanical oscillations is performed by modulating the power conversion of the machine side converter 203 via a modulation signal determined by a filter component based on the generator speed signal Wgen. This filter component may correspond to or be identical to the filter component DTD in FIG. 3.

The speed signal Wgen may be a measured or estimated rotation speed of the shaft of the drive train.

The filter component DTD is generally configured to pass the variations of the generator speed signal Wgen which are generated in response to the mechanical oscillations. For example, the filter component DTD may be a band pass filter where the band pass frequency range is configured to pass frequencies of the mechanical oscillations which it is desired to damp. Accordingly, the filter component DTD may be designed according to eigenfrequencies of the mechanical components.

Thus, the drive train damping power-signal Pdtd provided by the filter component DTD is determined so that it comprises a signal component which depends on the mechanical oscillations which it is desired to damp.

The drive train damping power-signal Pdtd is supplied to a transfer function Gff, configured as bandwidth modifying filter Gff arranged to increase the bandwidth and adjust the phase of a power transfer function Gvsm of the active power control loop of the virtual synchronous generator. The power transfer function Gvsm defines the relationship between the drive train damping power-signal Pdtd and the active grid power Pgrid supplied to the power grid or the active power produced by the line side converter 204.

Figure 4A:
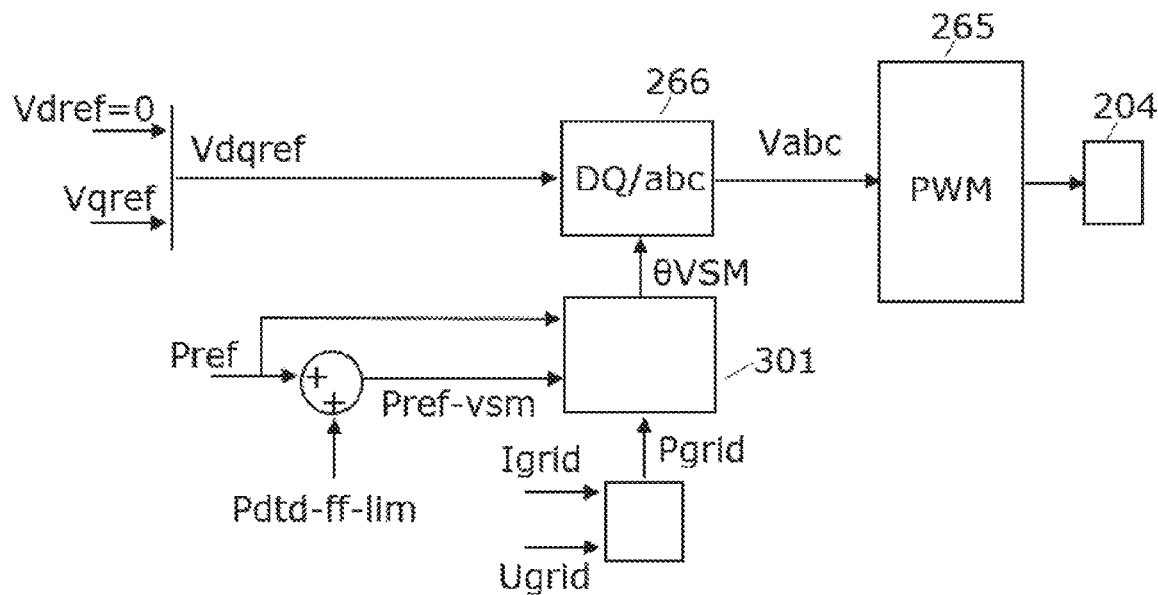
FIG. 4A shows an overview of the power control system.
Figure 4B:
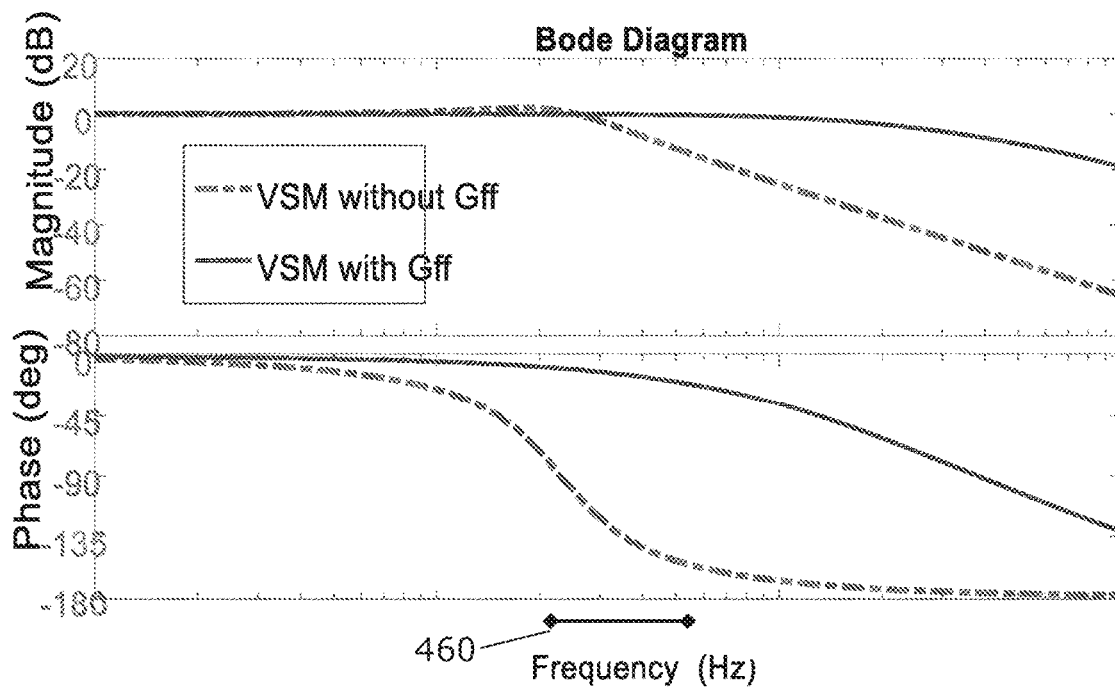
FIG. 4B shows bode plots for the magnitude and the phase of the power transfer function Gvsm.

FIG. 4B shows bode plots for the magnitude 451 and the phase 452 of the power transfer function Gvsm without the bandwidth modifying filter Gff and bode plots for the magnitude 453 and the phase 454 of the power transfer function Gvsm with the bandwidth modifying filter Gff.

As seen in FIG. 4B, due to the broadening of the bandwidth, frequency components of the train damping power-signal Pdtd which may be generated in response to the mechanical oscillations in the indicated frequency range 460 will be less affected by phase changes and attenuation of the power transfer function Gvsm when the bandwidth modifying filter Gff is applied.

The bandwidth modifying filter Gff is optional as the damping effect of the damping control system 300 is also achieved without the bandwidth modifying filter Gff, possibly with a less efficient damping effect.

Since the bandwidth of the power transfer function Gvsm depends on the short circuit ratio SCR of the grid, the bandwidth modifying filter Gff may be determined dependent on a short circuit ratio SCR of the grid.

The short circuit ratio may be measured at the turbine, e.g. at the output of the line side converter, at a point of common coupling where a plurality of wind turbines are electrically connected. Alternatively, the short circuit ratio may be estimated based on other estimated or measured electrical parameters, or received e.g. from a service provider.

The power transfer function between the drive train damping power-signal Pdtd and the active grid power Pgrid including the bandwidth modifying filter Gff can be formulated as:

$$\frac{Pgrid}{Pdtd} = \frac{\frac{\omega r}{2H} \times Pm \times \cos(\delta)}{s^2 + \frac{Dp}{2H}s + \frac{\omega r}{2H} \times Pm \times \cos(\delta)} \times Gff = Gvsm \times Gff$$

$$Pm(pu) = \frac{1}{Xr + \frac{1}{SCR}} \quad \delta(\text{rad}) = \sin^{-1}\left(\frac{Pref}{Pm}\right)$$

where Gvsm is the transfer function without the bandwidth modifying filter Gff, and where Xr is the reactance of the output inductors 215.

The bandwidth modifying filter Gff may be designed so that the bandwidth of Pgrid/Pdtd is increased by a desired spectral range in order not to have a phase shift or a change of the magnitude in a low frequency range where oscillation frequencies of the Pdtd signal is expected. As an example, the bandwidth modifying filter Gff may be designed as a lead filter according to Gff≈Gp/Gvsm, where Gp is the desired low-pass filter response, e.g. as described by the magnitude bode plots 453.

The output Pdtd-ff from the bandwidth modifying filter Gff is combined with the power reference Pref to generate the power reference Pref_vsm for the virtual synchronous generator implementation. The multiplication of the output Pdtd-ff with the gain factor Am is optional and is described elsewhere.

FIG. 3 shows the principle of determining the synchronous machine angle θVSM of the virtual synchronous generator based on an implementation of a swing equation of the virtual synchronous generator.

The synchronous machine angle θVSM is determined based on a virtual synchronous machine control concept which aims at generating a power response which corresponds to the power response from a real synchronous generator, including the inertia of the synchronous generator.

A power deviation ΔP is determined as the difference Pref_vsm−Pd−Pgrid, where Pd is a damping power determined according to the virtual synchronous model 301, and Pgrid is the generated active power. Under steady state conditions, the value of the power error ΔP is zero.

In response to a change in the power reference Pref_vsm due to change of the drive train damping power-signal Pdtd, the power deviation ΔP becomes non-zero. This causes the virtual synchronous angle θVSM to increase or decrease to reduce the power error ΔP. For example, if the change of drive train damping power-signal Pdtd causes a positive power deviation ΔP, the synchronous machine speed ωVSM will increase.

Thus, in response to fluctuations in the drive train damping power-signal Pdtd, the synthetic inertial response value becomes non-zero, which causes the virtual machine to either accelerate or decelerate to reach a new equilibrium condition. The variations in the acceleration causes variation in the generated power via the virtual synchronous angle θVSM which will reduce variations in the drive train damping power-signal Pdtd and thereby damp the mechanical oscillations.

The virtual synchronous machine control concept is utilized on the line side converter 204 using the swing equation to calculate θVSM.

The virtual synchronous model 301 includes a closed loop where the virtual synchronous machine rotational speed ωVSM is determined based the power deviation ΔP and an inertial integration model 311. The inertial integration model 311 is implemented as 1/(2Hs) where H is the inertia time constant and 1/s is the integration in s-domain. Accordingly, the power deviation ΔP is used as an input for the inertial integration model 311.

Since the derivative of the synchronous machine rotational speed ωVSM is proportional to the deviation between the power reference Pref_vsm and the grid power Pgrid, the integration of the difference ΔP gives the synchronous machine rotational speed ωVSM.

The grid power Pgrid can be determined based on the measured grid voltage Ugrid—or internal voltage references such as the magnitude reference Vqref, or transformations thereof, and the measured grid current Igrid.

The damping power Pd is determined as the difference between the rotational speed of the grid ωL and the synchronous machine rotational speed ωVSM multiplied with the damping factor Dp. The rotational speed of the grid ωL, i.e. the grid frequency is determined from the measured grid voltage Ugrid.

The synchronous machine angle θVSM is determined based on an integration of the synchronous machine rotational speed ωVSM according to ωr/s, where ωr is the rated synchronous generator speed.

Alternatively, the rotational speed of the grid ωL may determined based on a high-pass filtering of the determined synchronous machine rotational speed ωVSM, i.e. by determining the rotational speed of the grid ωL as the output of a high-pass filter which is arranged to filter the inputted synchronous machine rotational speed ωVSM. In this alternative the damping power Pd is determined based on a high-pass filtering of the synchronous machine rotational speed ωVSM.

In general, the virtual synchronous model 301 determines the angle of the virtual machine θVSM based on the power deviation ΔP, the inertial integration model 311, e.g. implemented as 1/(2Hs) and a feedback of the damping power Pd determined based on ωVSM and an integration of ωVSM. In other words, the synchronous machine rotational speed ωVSM and the synchronous machine angle θVSM are determined so that they are indicative of an integrated deviation between a power reference Pref for a desired power output of the wind turbine and the virtual grid power Pvsm.

The control systems 250 and the damping control system 300 can be implemented based on power values Pref, Pdtd, Pd, Pgrid, but may equivalently be implemented based on corresponding torque values Tref, Tdtd, Td, Tgrid based on the relationship where power equals torque times rotation frequency, e.g. the synchronous machine rotational speed ωVSM.

In situations where the power reference Pref is low, it may be problematic if larger variations in the drive train damping power-signal Pdtd, or the filtered drive train damping power-signal Pdtd-ff is added to the power reference Pref and thereby provided as the virtual synchronous power reference Pref_vsm for the virtual synchronous model 301. Furthermore, in another example, the governing oscillation in the drive train can change frequency when the turbine active power output approaches zero in response to a decrease of the power reference Pref, e.g. since oscillations of the first drive train mode are reduced compared to oscillations of the 3P oscillations generated due lee side effects of the rotor blades 103.

Therefore it may be beneficial to reduce or limit the amplitude of variations of the rotor speed signal Wgen or the output of the filter component DTD.

For example, the amplitude of the drive train damping power-signal Pdtd may be reduced dependent on the power reference Pref, e.g. so that the amplitude is reduced if the power reference Pref is below a given power threshold Plim.

FIG. 3 shows an example, for reducing the amplitude of the rotor speed variations by multiplying the drive train damping power-signal Pdtd, or the filtered drive train damping power-signal Pdtd-ff, with a gain factor Am. The gain factor Am may be determined by a gain factor function 321 as a function of the power reference Pref. The gain factor Am factor may set to one for Pref>Plim and to a value less than one for Pref<Plim or to a variable value less than one Pref<Plim, where the variable value is a function of the power reference Pref.

For example, as indicated in FIG. 3, the gain factor Am could be as Pref-lpf/Plim or Pref/Plim for Pref<Plim and may be set to one for Pref>Plim. Pref-lpf is a low pass filtered version of the power reference, where the low pass filter LPF is used to ensure that the gain factor Am is changed smoothly and robustly.

As an example, the power threshold Plim may be set to 0.05 PU—corresponding to 5% of the rated power of a wind turbine—so that the gain factor Am increases linearly from zero to 1 at the power threshold Plim. Clearly, other functions 321 such as non-linear functions, stepped functions or look-up tables may be used instead of the linear function Am=Pref-lpf/Plim.

In another example, a hysteresis function combined with a rate limiter is used for determining the gain factor Am as a function of the power reference Pref.

In addition or as an alternative to modifying the gain factor Am, the damping power Pd may be determined as a function of the power reference Pref, e.g. so that the damping power Pd is increased as a function of the power reference, or so that the damping power Pd is increased if the power reference Pref is below a given power threshold Plow.

The increase of the damping power provides increased stability of the damping control system 300 for low values of the power reference Pref.

As illustrated in FIG. 3, the adjustment of the damping power Pd may be achieved by applying a hysteresis function 322 which determines a damping factor Dp dependent on the power reference Pref so that the damping factor Dp is set to DpH for Pref<Plow and to DpL for Pref>Plow, where DpH is greater than DpL. In order to ensure that changes of the value of the damping factor Dp occurs without step-changes, the damping factor is passed through a rate limiter 323 to generate smooth changes of the damping factor Dp. The determined damping factor is inputted to the virtual synchronous model 301 so that damping power Pd is adjusted according to the damping factor Dp by multiplying the damping power Pd with the damping factor Dp.

In another example, the damping factor Dp is determined using a function equivalently to the function 321 and the method for determining the gain factor Am.

In an example, the power thresholds for the power reference Plow and Plim are equal.

FIG. 4A shows an overview of the diagrams of FIG. 2B and FIG. 3 with the potentially limited drive train damping signal Pdtd-ff-lim combined with the power reference Pref to provide an input to the virtual synchronous generator model 301 to provide damping of mechanical oscillations.

Figure 5:
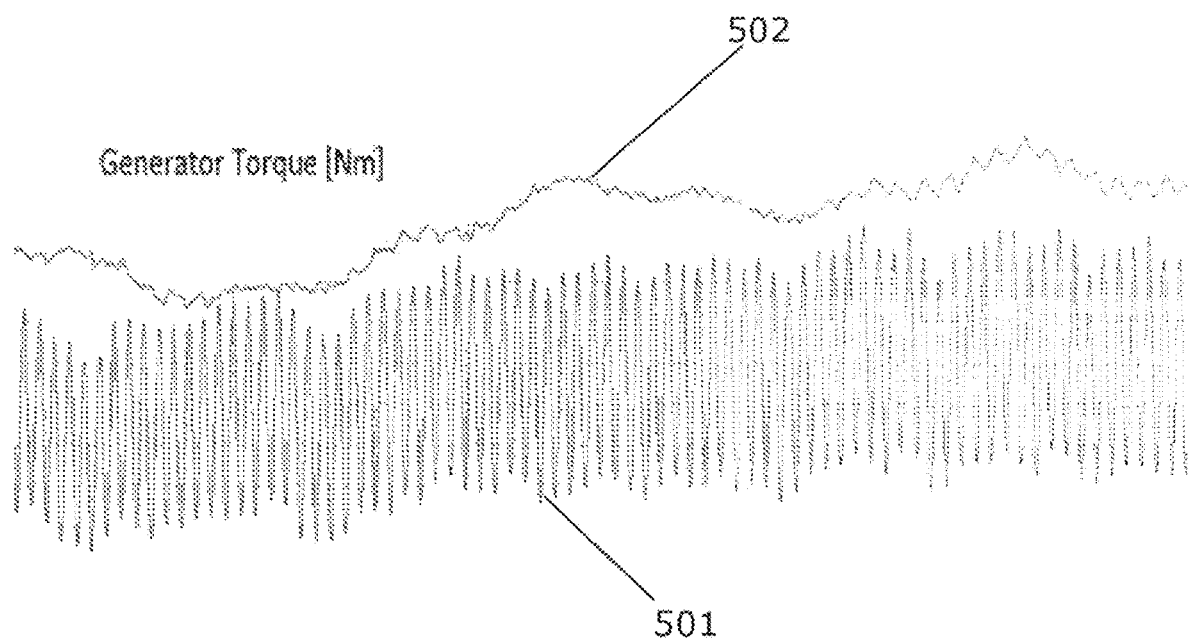
FIG. 5 illustrates an improved damping effect achieved by the damping control system.

FIG. 5 illustrates the variations 501 in the generator torque when the damping control system 300 is used for damping mechanical oscillations, and the variations 502 in the generator torque when the bandwidth modifying filter Gff is applied in the damping control system 300. Thus, the effect of applying the bandwidth modifying filter Gff to the damping control system 300 provides improved damping of the generator torque oscillations caused by mechanical oscillations.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for damping mechanical oscillations of a wind turbine, the wind turbine comprises a drive train driven by a rotor, a generator driven by the drive train, a machine side converter, and a line side converter arranged to supply power to a grid, the method comprising:
   obtaining a speed signal representing a rotation speed of the generator;
   determining a drive train damping power-signal based on the speed signal;
   determining a power deviation based on a difference between a power reference for a desired power output of the wind turbine, a damping power and a grid power supplied by the line side converter to the grid;
   determining a virtual synchronous machine rotational speed and/or a virtual synchronous machine angle based on the power deviation so that a derivative of the virtual synchronous machine rotational speed is indicative of the power deviation;

providing a voltage reference for a voltage amplitude or a reactive power to be generated by the line side converter;

determining a converter reference for controlling the line side converter to generate a desired active power based on the virtual synchronous machine angle and the voltage reference; and controlling the line side converter based on the converter reference.

2. The method of claim 1, wherein the drive train damping power-signal is determined so that the drive train damping power-signal comprises a signal component which depends on the mechanical oscillations.

3. The method of claim 1, wherein determining the drive train damping power-signal comprises applying a bandpass filter to the speed signal.

4. The method of claim 1, wherein determining the drive train damping power-signal comprises applying a bandwidth modifying filter to increase the bandwidth and adjust a phase of a transfer function defining a relationship between the drive train damping power-signal and the grid power.

5. The method of claim 4, comprising determining the bandwidth modifying filter dependent on a short circuit ratio of the grid, where the bandwidth of the transfer function depends on the short circuit ratio.

6. The method of claim 1, further comprising modifying an amplitude of the drive train damping power-signal dependent on the power reference.

7. The method of claim 6, wherein the modification of the amplitude is determined so that the amplitude is reduced when the power reference is below a given power threshold.

8. The method of claim 1, further comprising modifying the damping power dependent on the power reference.

9. The method of claim 8, wherein the modification of the damping power is determined so that the damping power is increased when the power reference is below a given power threshold.

10. The method of claim 9, comprising limiting a rate of change of the damping power.

11. The method of claim 1, where the virtual synchronous machine rotational speed is determined based on a combination of a feedback of the damping power, the power reference, the drive train damping power-signal, the grid power and an inertial integration model, where the virtual synchronous machine angle is determined based on an integration of the virtual synchronous machine rotational speed, and where the damping power is determined based on the virtual synchronous machine rotational speed.

12. The method of claim 1, comprising:
obtaining a network voltage at a connection point of an output of the line side converter;
determining a rotational speed of the grid based on the network voltage; and
determining the damping power based on the virtual synchronous machine rotational speed and the rotational speed of the grid.

13. A control system for configured for damping mechanical oscillations of a wind turbine, the wind turbine comprises a drive train driven by a rotor, a generator driven by the drive train, a machine side converter, and a line side converter arranged to supply power to a grid, wherein the control system is configured to perform an operation, comprising:

obtaining a speed signal representing a rotation speed of the generator;

determining a drive train damping power-signal based on the speed signal;

determining a power deviation based on a difference between a power reference for a desired power output of the wind turbine, a damping power and a grid power supplied by the line side converter to the grid;

determining a virtual synchronous machine rotational speed and/or a virtual synchronous machine angle based on the power deviation so that a derivative of the virtual synchronous machine rotational speed is indicative of the power deviation;

providing a voltage reference for a voltage amplitude or a reactive power to be generated by the line side converter;

determining a converter reference for controlling the line side converter to generate a desired active power based on the virtual synchronous machine angle and the voltage reference; and controlling the line side converter based on the converter reference.

14. A wind turbine, comprising:
a tower;
a nacelle;
a generator disposed in the nacelle;
a rotor mechanically couple to the generator and extending from the nacelle;
a drive train driven by the rotor, wherein the generator driven by the drive train;
a plurality of blades coupled to the rotor; and
a control system configured for damping mechanical oscillations of the wind turbine by performing an operation, comprising:
  obtaining a speed signal representing a rotation speed of the generator;
  determining a drive train damping power-signal based on the speed signal;
  determining a power deviation based on a difference between a power reference for a desired power output of the wind turbine, a damping power and a grid power supplied by a line side converter to a grid;
  determining a virtual synchronous machine rotational speed and/or a virtual synchronous machine angle based on the power deviation so that a derivative of the virtual synchronous machine rotational speed is indicative of the power deviation;
  providing a voltage reference for a voltage amplitude or a reactive power to be generated by the line side converter;
  determining a converter reference for controlling the line side converter to generate a desired active power based on the virtual synchronous machine angle and the voltage reference; and
  controlling the line side converter based on the converter reference.

* * * * *